(12) United States Patent
Hua et al.

(10) Patent No.: US 11,574,078 B2
(45) Date of Patent: Feb. 7, 2023

(54) REAL-TIME FEATURE ACTIVATION IN DISTRIBUTED ENVIRONMENT

(71) Applicant: salesforce.com, inc., San Francisco, CA (US)

(72) Inventors: Jimmy Hua, San Francisco, CA (US); Gang Shu, San Francisco, CA (US); Chong Pang, Union City, CA (US); Nidhi Baheti, Belmont, CA (US); Liuxizi Xu, San Francisco, CA (US); Barkkarn Aravinda Arasakutti Vetrivelu, Dublin, CA (US); Jaisudha Gunasekaran, San Jose, CA (US); Sai Prashanth Lakshminaraayana, San Francisco, CA (US); Ravi L Honakere, San Ramon, CA (US); Bijoy Sarkar, San Ramon, CA (US); Frédéric Voituret, Joinville (FR)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/184,096

(22) Filed: Feb. 24, 2021

(65) Prior Publication Data
US 2022/0269801 A1 Aug. 25, 2022

(51) Int. Cl.
*G06F 21/62* (2013.01)
*H04L 9/40* (2022.01)
*G06F 16/953* (2019.01)
*H04L 67/10* (2022.01)
*H04L 67/51* (2022.01)

(52) U.S. Cl.
CPC .......... *G06F 21/629* (2013.01); *G06F 16/953* (2019.01); *H04L 63/102* (2013.01); *H04L 63/105* (2013.01); *H04L 67/10* (2013.01); *H04L 67/51* (2022.05)

(58) Field of Classification Search
CPC ................. G06F 21/629; G06F 16/953; H04L 63/102; H04L 63/105; H04L 67/10; H04L 67/51
See application file for complete search history.

(56) References Cited

U.S. PATENT DOCUMENTS

2003/0046589 A1* 3/2003 Gregg ..................... H04L 63/10
726/5

* cited by examiner

*Primary Examiner* — El Hadji M Sall
(74) *Attorney, Agent, or Firm* — Holland & Hart LLP

(57) ABSTRACT

Methods, systems, and devices for data processing are described. According to the techniques described herein, an application server may be used for real-time provisioning for features for a user. The application server may validate requests from the user for feature activation or deactivation and after validation, may communicate with a provisioning server, which may be non-local to the user or the application server, to indicate validation and activation or deactivation of a feature for the user.

20 Claims, 9 Drawing Sheets

REAL-TIME FEATURE ACTIVATION IN DISTRIBUTED ENVIRONMENT

FIELD OF TECHNOLOGY

The present disclosure relates generally to database systems and data processing, and more specifically to real-time feature activation in distributed environment.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a single provisioning server may handle feature provisioning (e.g., feature activation or deactivation) for a user or client. Such techniques for provision handling allow for secure transactions between the user and the provisioning server. In distributed environments, however, this architecture may introduce delays in the activation or deactivation of features for the user, and may be limited in the support of different types of feature activation (such as feature trials).

DETAILED DESCRIPTION

Figure 1:
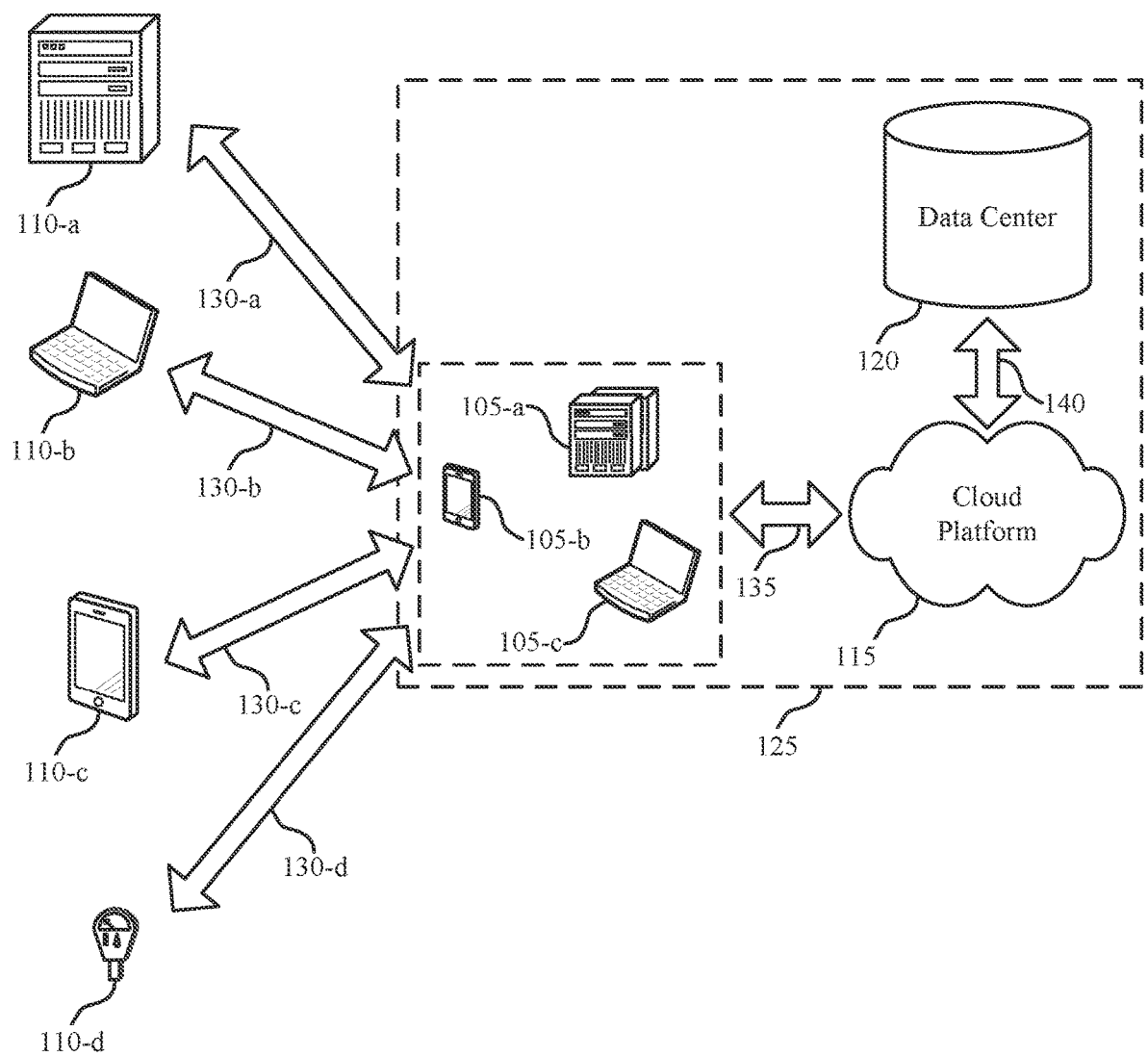
FIG. 1 illustrates an example of data processing at an application server system that supports real-time feature activation in distributed environment in accordance with aspects of the present disclosure.

For some applications, a single server (e.g., a provisioning server) handles the purchasing and provisioning (e.g., activation or deactivation) of features or services of an application for a user or set of users of the application. Using a single server may improve security as each request for provisioning of a feature (e.g., activation or deactivation of the feature) from a user is validated by the provisioning server and once validated, the feature is activated (e.g., by an account manager accessing the provisioning server). Such techniques help ensure that no invalid requests are acted upon and that only features that available to a user are activated. Because all transactions for provisioning of features for a user of an application go through a single server, provisioning of services may be delayed (e.g., by minutes, hours, or days). In a distributed or multi-tenant environment that supports multiple application servers throughout a geographic region, although there are servers that run various instances of applications for users, provisioning of features may still be handled by a single provisioning server (which may be non-local to the application server running an instance of the application for a user, or non-local to the user requesting provisioning of a feature, or both). Further, such a system architecture and the techniques employed for feature provisioning based on the system architecture in a distributed system may not be capable of supporting feature trials (e.g., activation of a feature for a given amount of time and thereafter deactivated), multiple feature trials, or varying trial period length for different features or different users, which may result in lost revenue for companies supporting the application or poor user experience for users of the application, among other issues.

Techniques herein support real-time feature trials and provisioning in a distributed or multi-tenant environment for a user of an application. According to some aspects, an application server, which may support a tenant in the distributed environment, may be non-local to a provisioning server that tracks or maintains features of an application and individual user permissions for provisioning of features or trials for the user. The application server may run an instance of an application for a user and may identify a configuration for the user for running the instance of the application. The configuration may be stored locally at a device associated with the user or may be stored locally at the application server and may include information related to feature trials for different features available to a user. The configuration may support trials of a feature of the application, multiple feature trials for a given feature, different trial period lengths for different features (which may be based on user type, application type, or other factors), and may indicate a set of features of the application and a corresponding set of permissions of the user for the set of features, such as permissions related to trialing of one or more features for the user.

The user may request the application server to activate or deactivate a feature through a permission change request, and the application server may validate the request from the user. Once validated, the application server may provision the feature (e.g., activate or deactivate the feature) for trialing, as requested by the user, and enable the feature for the user running the instance of the application on the application server. Such techniques enable provisions to be handled at least in part by an application server without going through a provisioning server prior to changing permissions (e.g., activating or deactivating a feature, granting permissions to a software suite, etc.) for the user, which may allow feature trials and different trial period lengths for features of an application for a user, and may reduce the timing for enabling a feature trial for the user. The techniques and systems herein also may allow feature provisioning if the provisioning server is temporarily inaccessible by the user or application server, which may improve user experience overall.

The configuration for the user may be generated and stored locally at a user device or at a database accessible by or associated with the application server. The configuration may contain information related to which features are activated or deactivated for the user, which features are available to the user (e.g., based on a user type or priority of the user), and different trial information for a feature such as a number of trial periods available to the user for a feature, length of trial periods for one or more features, or other information. The configuration may be updated by the application server after validation of a permission change, and the updated configuration may be stored at the application server or at the user device. Optionally, the application server may send a request to the provisioning server to update the permissions for the user or provisioning a feature based on the updated configuration for the user such that the provisioning server is aware of the permission change validated and implemented by the application server. In some aspects, the provisioning server may request an update (e.g., periodically) of a configuration for a user or a set of users of the application server, and the application server may send the updated configuration information for a user or set of users to the provisioning server. This may allow the provisioning server to track and maintain provisioning for purchasing of features for users across the distributed system, which may result in a more dynamic and more enhanced experience for the user. The techniques herein may also allow for a la carte add-ons for an application for a user, real-time functionality with accounting and provisioning at the provisioning server occurring asynchronously.

Aspects of the disclosure are initially described in the context of an environment supporting an on-demand database service. Aspects of the disclosure are further described with respect to a general system diagram that supports data processing and real-time feature activation in a distributed environment, and a process flow, which may be used for feature trialing in accordance with the techniques herein. Aspects of the disclosure are further illustrated by and described with reference to apparatus diagrams, system diagrams, and flowcharts that relate to real-time feature activation in a distributed environment.

FIG. 1 illustrates an example of a system 100 for cloud computing that supports real-time feature activation in distributed environment in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to-client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Subsystem 125 may support one or more applications for a user, such as a contact 110 or cloud client 105, such that an instance of an application for a user may be run using components or servers of the subsystem 125. For example, the instance of the application may be run on an application server of the subsystem 125 that is accessible by a user and the instance of the application may be configured with different features for the user based on a user configuration, user type, priority of the user, etc. In some aspects, a user may request activation or deactivation of a feature of an application, and such requests may be handled by a provisioning server that is non-local to the user and different from the application server running the instance of the application for the user. The provisioning server may handle provisioning of features for users in the system 100, and may track and maintain all purchases and feature requests from users, and because a single provisioning server (which may be non-local to the user) handles all provisioning requests for the users of the system, validation and actions to respond to requests from users may be delayed for minutes, hours, or days, which may result in poor user experience. Further, such techniques may not support feature trials or other add-ons, which may result in lost revenue for the application.

According to aspects herein, subsystem 125 may support real-time feature handling using an application server running an instance of an application for a user. A user may be associated with a configuration for an application, which may be stored locally at a user device or at a database accessible by the application server. The configuration may indicate features of the application available for the user and corresponding permissions for the features that are configured for the user including feature trial information such as number of times a user may trial a given feature, varying trial period lengths for different features, or other information. The user may request a permission change for a feature (e.g., the user may request a trial of a feature) and the application server may validate the request, and once validated, the application server may act on the request by activating (or deactivating) the trial of the feature for the user and updating the configuration and corresponding permissions for the user. The instance of the application may reference the updated configuration indicating the activated or deactivated features, and may run the instance of the application for the user according to the updated configuration, which may allow for decreased time to activate a feature trial for the user (e.g., the feature may be available instantaneously upon the user submitting the request), leading to improved user experience. In some cases, the application server may communicate with a provisioning server asynchronously to request that the provisioning server update the configuration for the user at the provisioning server based on local provisioning (e.g., trial activation or purchasing) performed by the application server. Additionally, or alternatively, the provisioning server may periodically request provisioning updates for one or more users supported by the application server, and the application server may send information indicating any feature activations, deactivations, trial information, add-ons, etc. to the provisioning server.

According to one example, a user may open an application at a user device, and an instance of the application may be run on the application server, which may be a tenant in a distributed environment. The application may be setup with a number of features for the user based on a user configuration that is stored at the user device. In some cases, the user may wish to trial a feature of the application, and may login to a webstore associated with the application to request the trial. Once the trial is requested by the user, the application server may validate the request. For instance, the application server may verify that the trial has not yet been requested by the user (e.g., the user has not previously trialed the feature), or may verify that the feature is available to the user based on user location. Once the application server validates the trial request, the application server may update application permissions for the user in a user configuration that is stored locally at a user device or application server, or otherwise accessible by the application server. Once updated, the trial of the feature may be activated for the user and run on the instance of the application at the application server. This process may be instantaneous or real-time such that the feature may be available for use immediately upon submitting the request, which may be an improvement over the latency incurred by sending the feature trial request to a provisioning server. At some point after the request is trial is activated by the application server, the application server may send a message to the provisioning server to verify that the trial is valid (e.g., process an order or verify account information for the user). However, in some examples, the application server may not communicate with the provisioning server after the trial has been activated. In some cases, at regular intervals (e.g., periodically), the provisioning server may request an update from the application server regarding any permission changes allowing the provisioning server to update permissions for the user at the provisioning server (e.g., for handling payment, if any, or other business transactions).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
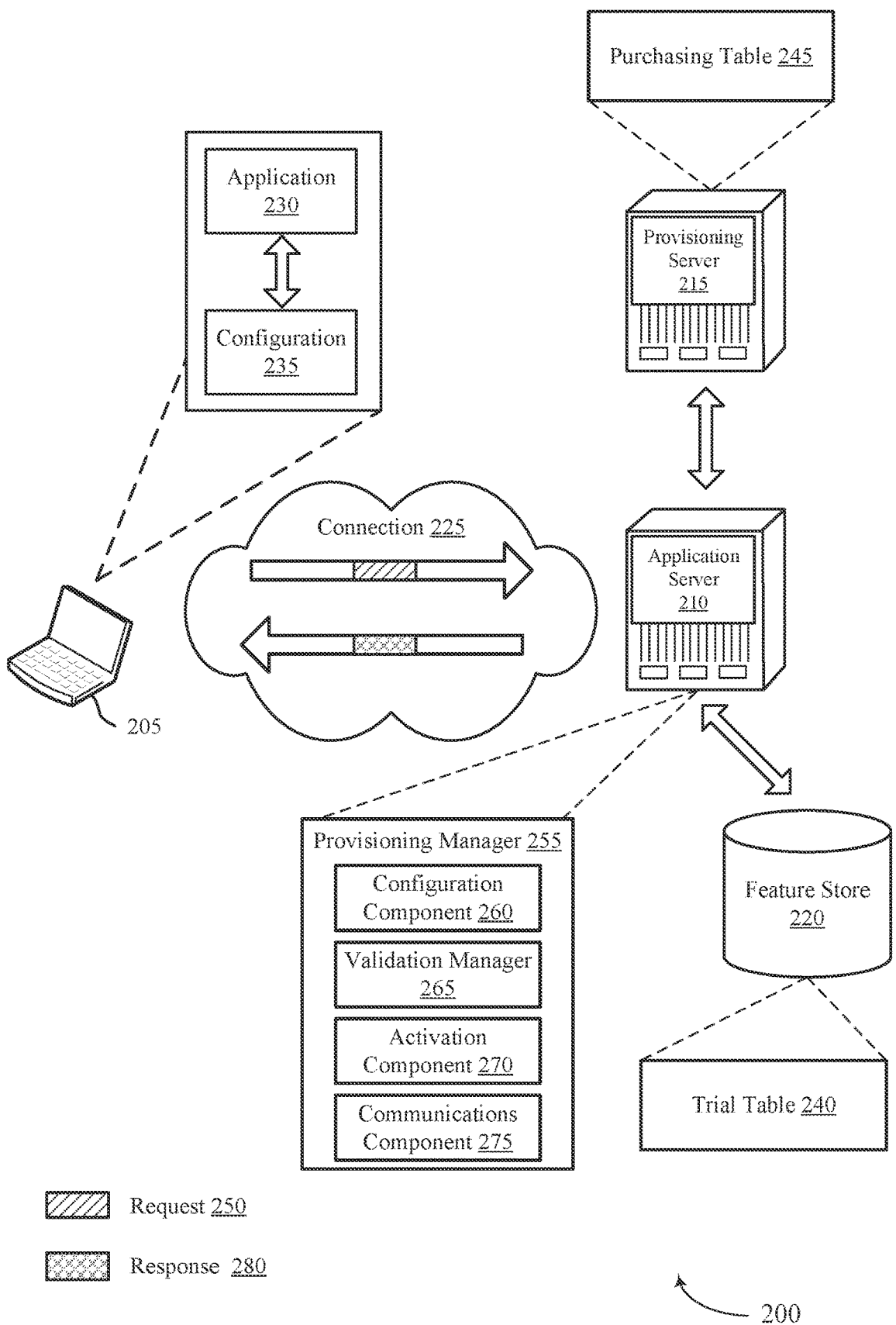
FIG. 2 illustrates an example of a data processing system that supports real-time feature activation in distributed environment in accordance with aspects of the present disclosure.

FIG. 2 illustrates an example of a data processing system 200 that supports real-time feature activation in distributed environment in accordance with aspects of the present disclosure. The data processing system 200 may be an example of a distributed system or a multi-tenant environment, and may include a user device 205, an application server 210, a provisioning server 215, and a feature store 220, each of which may be components of a system 100 as described with reference to FIG. 1.

A user associated with user device 205 may be supported by application server 210. The user device 205 may be associated with a tenant in a distributed system, and may communicate with the application server 210 via a connection 225. The connection 225 may be a wired or wireless connection that allows the exchange of information exchanged between the application server 210 and the user device 205. The application server 210 may be local to the user device 205 and may be configured to run an instance of application 230 for the user device 205. For example, the application server 210 may be in a same geographic region as the user device 205. The application server 210 may support multiple tenants of a multi-tenant system that are running a same application (e.g., enterprise application related to CRM or the like).

The provisioning server 215 may be local or non-local to the user device 205 or the application server 210. For example, the provisioning server 215 may be located in a first region of a country (e.g., the West coast), where the application server 210 may be located in a different region of the country or a different country entirely. Even if the provisioning server 215 and application server 210 are located in the same geographic region, the provisioning server 215 may run on a separate datacenter as the application server 210 for security purposes. The provisioning server 215 may handle provisioning for one or more users or tenants in the distributed system including the user associated with user device 205. The provisioning server 215 may track and maintain user permissions for features of an application of an organization of the distributed system. The provisioning server 215 may be responsible for maintaining the purchase information and current payment status for multiple applications for multiple tenants of a multi-tenant distributed system. For example, the provisioning server 215 may include a purchasing table 245 that maintains and tracks purchasing information for a number of users, which may be grouped into organizations (e.g., businesses or companies), and corresponding features and permissions for the number of users for an application.

When an application 230 on a user device 205 is run, the application server 210 may access a configuration 235, which may be stored locally on the user device 205 (or at a database accessible by the application server 210, such as the feature store 220), and the application server 210 may use the configuration 235 to configure (e.g., enable or disable) features of the instance of the application 230 running on the application server 210. The configuration 235 may include features of the application 230 for the user and a set of permissions for the features of the application 230 for the user. The set of permissions may indicate which features are activated or deactivated for the user for the application 230. According to some aspects, the user associated with the user device 205 may wish to trial a feature of the application 230. The user device 205 may send a request 250 for a permission change corresponding to the trial of the feature for the application 230 over connection 225, and the application server 210 may receive the request 250.

A provisioning manager 255 of the application server 210 may be used to validate the request 250 and perform provisioning handling in real-time for the user device. For example, a configuration component 260 of the provisioning manager 255 may identify a user configuration for the application by accessing the configuration 235 at the user device 205. A validation manager may validate the request 250 by accessing the trial table 240 for the user. The trial table 240 may indicate which features of the application 230 or trials are available to the user. For instance, in a case of the request 250 including a trial of a feature of the application 230, the validation manager 265 may access the trial table 240 to determine whether the user has previously trialed the feature or if the trial of the feature or the feature itself is available for the user. If the user is not able to trial the feature (e.g., due to having previously trialed the feature one or more times before), the validation manager 265 may deny the request 250 from the user device 205 and send a response 280 to the user device 205 over the connection 255 notifying the user that the user is unable to trial the feature. If the user is able to trial the feature, the validation manager 265 may validate the request 250 which in some cases may include updating the trial table 240 for the user with information indicating that the given feature for the user is activated for a trial. The trial table 240 may be update to include a product or feature ID of the given feature, a stock-keeping unit (SKU) associated with the given feature, a start date of a trial or purchase, an end date of the trial or purchase, a current status of the trial or purchase for the given feature (e.g., whether trial or purchase is currently active for the user), a provisioning status (e.g., whether the provisioning server 215 has been notified of the provisioning of the given feature), among other information.

Once the request 250 is validated, an activation component 270 of the provisioning manager 255 activates the feature for trial and updates the trial table 240. For example, the activation component 270 may update the permissions for the user in the trial table 240 and in some cases may send a response 280 to the user device 205 indicating that trial is activated and requesting the user device to update the configuration 235. The user device 205 may update the configuration 235 to match the permissions for the user as specified in the trial table 240 so that future instances of the application 230 are able to use the updated configuration 235 once opened by the user device 205 and run on the application server 210 such that when the application 230 is run, features of the application 230 check permissions of the configuration 235 and if the configuration 230 indicates that the feature is on or activated, the application server 210 allows the instance of the application 230 to enable the feature.

After recording and saving the updates to the trial table 240, a communications component 275 of the provisioning manager 255 may communicate with the provisioning server 215 by indicating information of the updates and permission changes for the user to the provisioning server 215. For example, after updating the trial table 240, the communications component 275 may send a message to the provisioning server 215 that include information indicating that a feature for the application 230 for the user has been activated or entered a trial phase, has been deactivated, etc. depending on the request 225 from the user device 205. In some cases, the communications component 275 may send an indication to the provisioning server 215 that validation of the request 250 has been successful. After receiving the indication from the communications component 275, the provisioning server 215 may update a purchasing table 245 at the provisioning server 215 that corresponds to the user. If updating of the purchasing table 245 is successful, the provisioning server 215 may send a message to the application server 210 indicating that updating was successful, and the application server 210 may update the trial table 240 confirming that the provisioning server 215 is up to date.

If updating of the purchasing table 245 is unsuccessful, a message from the provisioning server 215 to the application server 210 may not be transmitted, and the application server 210 may request updating at the provisioning server 215 at a later time (e.g., using a different procedure). In some examples, a time-based job scheduler (e.g., a cron job or process) may be ran periodically (e.g., at certain times or intervals throughout a day) at the application server 210 such that the application server 210 queries the provisioning server 215 for records in the purchasing table 245 at the provisioning server 215 to check whether the provisioning server 215 has updated the purchasing table 245 (e.g., to confirm whether the provisioning server 215 acted or processed the order) to reflect the permission changes of the user. If the order has been acted on by the provisioning server 215, the application server 210 indicates, in the trial table 240, that the order has been processed by the provisioning server 215. If the order has not been acted on by the provisioning server 215, the application server 210 may query the provisioning server 215 again. If the end date in the trial table 240 is reached for a user (e.g., for a trial of a feature), the application server may deactivate the trial of the feature and in some cases, may only update purchasing information for the feature if the feature has not yet been verified.

According to one example, the user may initiate a checkout flow (e.g., from a webstore) that triggers a permission change for the user such as a purchasing of a new product or buying additional licenses for a product already owned by the user. Information related to the permission change may be retrieved asynchronously (e.g., by the application server 210 or the provisioning server 215) and placed in a checkout cache specific to an organization associated with the application 230 running on the application server 210. When the user attempts to complete the checkout, the checkout flow will access the cache, and data for the user related to the checkout (e.g., feature activation) is enabled or rendered for the user shortly thereafter (e.g., immediately after checkout completion). Other users associated with the same organization may be able to use the same cached data at checkout. In some cases, data in the cache may automatically invalidated when the checkout is complete or when there is an error during checkout. Such organization-specific caching may enable quicker checkout procedure for the user associated with the organization and reduce the complexity of data structures for checkout.

The techniques herein allow for activation of features for an application 230 for a user even in cases where the provisioning server 215 is unable to be reached at the time of the request 250 from the user. In some cases, logic for activating or deactivating a trial of a feature may be embedded or associated with the feature or produce itself. For example, a trial table 240 or configuration 235 may include a copy of SKUs, trial lengths allowed or available, or other trial information associated with the feature. A database such as trial table 240 may track each instance of activation, which ensures that trials occur an allowable number of times (e.g., 1 or 2 times per user or per time period). Trial information may also include history so that trials of a given length can be activated or deactivated and used until the given length is reached for a user. In some aspects, the number of times a trial is allowed may be tracked and a job may be run (e.g., daily) to evaluate if the trial should continue to be activated or should expire (e.g., deactivated). Such techniques also allow for organizations to activate or deactivate features in a siloed environment or data center in which a provisioning server 215 may not be accessible or without provisioning server 215 involvement. In such aspects, the data and information about a purchase or feature activation may synchronize between the application server 210, provisioning server 215, and the user device 205 according to a cadence allowing the provisioning server to not be present at all times.

Figure 3:
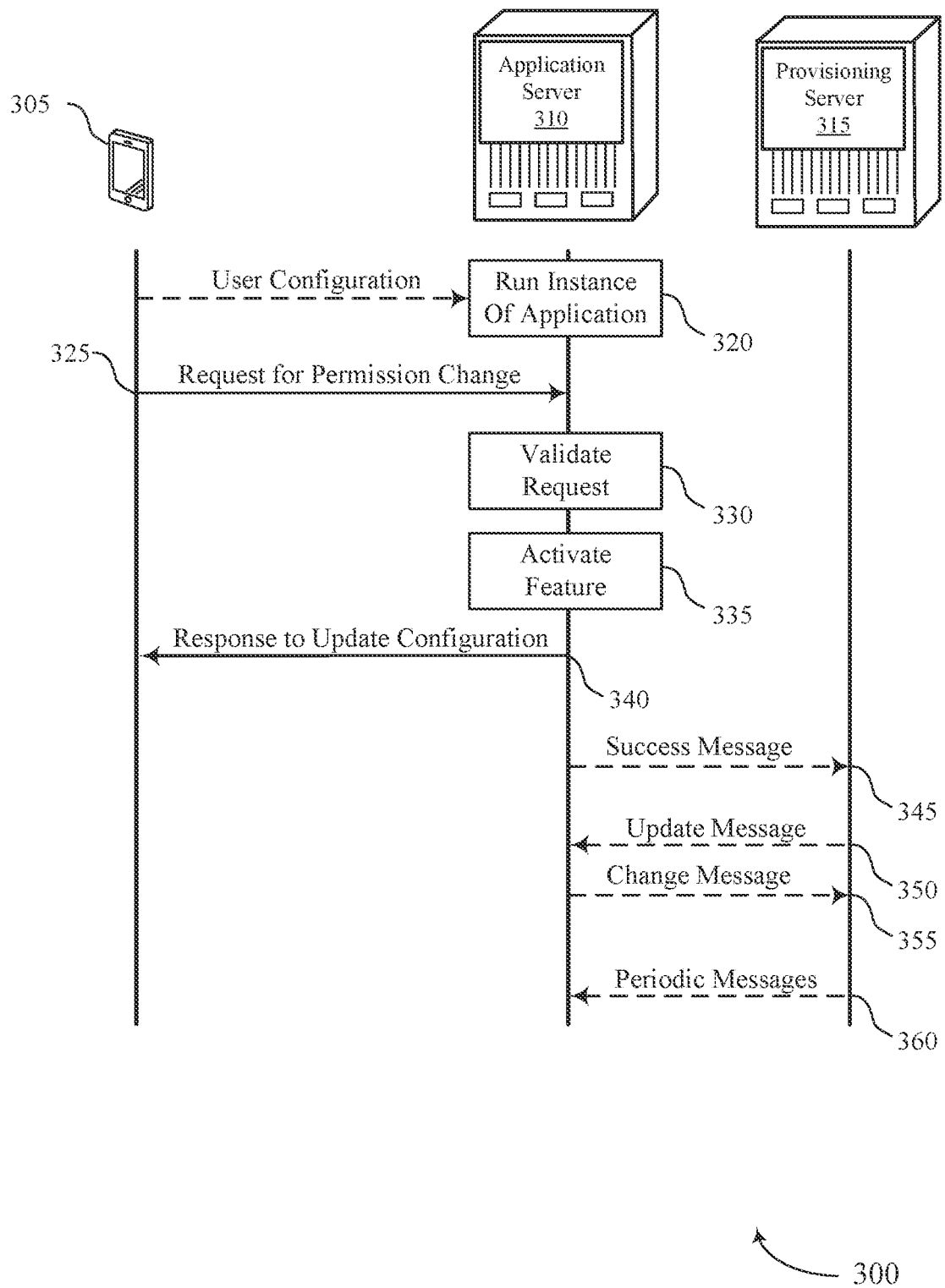
FIG. 3 illustrates an example of a process flow that supports real-time feature activation in distributed environment in accordance with aspects of the present disclosure.

FIG. 3 illustrates an example of a process flow 300 that supports real-time feature activation in distributed environment in accordance with aspects of the present disclosure. Process flow 300 may include a user device 305, an application server 310, and a provisioning server 315, each of which may be examples of the corresponding devices as described herein with respect to FIG. 2 for example.

At 320, application server 310 may run an instance of an application for the user device 305. In some examples, running the instance of the application may include accessing a user configuration stored locally at the user device 305. For example, the application server 320 may request the user configuration from the user device 305 and the user device 305 may send the user configuration to the application server 310. In other examples, the application server 310 may access a database of the application server 310 to determine or identify the user configuration. In some cases, the configuration for the user may be for the running on the application server and may indicate one or more features of the application and a corresponding set of permissions for the user for the one or more features of the applications. The instance of the application running at 320 may be configured for the user based on the user configuration such that only features that are currently activated for the user are enable and run on the application server 320. The application server 310 may support feature activation and trial activation for multiple user devices associated with a tenant and for multiple tenants of a multi-tenant system.

At 325, the user device 305 may send a request for a permission change for a feature of the application. The request for a permission change may be a request to activate or deactivate one or more features of the application. For instance, the user device 305 may request a trial, an upgrade, a downgrade, a purchase or license, or the like for a new product or one or more features of the application. The application server 310 may support simultaneous feature trials with different durations, different activation and deactivation dates, or any combination of characteristics.

At 330, the application server 310 may perform a validation procedure of the permission change to validate that the feature of the plurality of features is available to the user based on the set of permissions. In some examples, the validation procedure may verify whether the feature is available for the user device 305 based on the set of permissions or a region of the user device 305. Performing the validation procedure may include determining which features are available to the user device 305 based on a priority level of the user (e.g., a tier such as silver tier, gold tier, platinum tier), and the priority level may be specific to the application, the user, or both. In some aspects, validating the permission change may be based on verifying account or payment information of the user for the feature (e.g., whether payment information is available and up to date for the user).

At 335, the application server 310 may activate the feature based on a successful validation procedure and the request. Activating the feature may include updating a purchasing table at the application server 310 to enable the feature for the application for the user. In some cases where the permission change corresponds to a trial of the feature, activating the feature may include updating the set of permissions for the user for the feature, where the set of permissions include trial information for the trial of the feature including a trial start date, a trial end date, a trial status, or a provisioning server status, or any combination thereof. In some other cases where the permission change corresponds to a purchase of the feature, activating the feature may include updating the set of permissions for the user for the feature within the configuration, where the set of permissions includes purchase information for the purchase of the feature including a purchase start date, a purchase end date, a purchase status, or a provisioning server status, or any combination thereof.

At 340, after activating the trial of the feature for the user, the application server 310 may send a response to the user device 305 requesting the user to update the configuration stored locally at the user device 305.

After activating the trial of the feature for the user, the application server 310 may communicate with the provisioning server 315 to exchange information related to the activated feature for the user. For example, at 345, the application server 310 may optionally transmit, to the provisioning server 315, a message (e.g., a success message) indicating a successful validation procedure of the permission change requested by the user and an indication that the feature for the user is activated.

Optionally, at 350, the application server 310 may receive, from the provisioning server, a message requesting an update of the set of permissions for the user, and in response, may transmit, at 355, information indicative of the permission change and the activated feature for the user.

Optionally, at 360, the application server 310 may periodically receive messages from the provisioning server requesting permission updates for a set of users of the application including the user.

Figure 4:
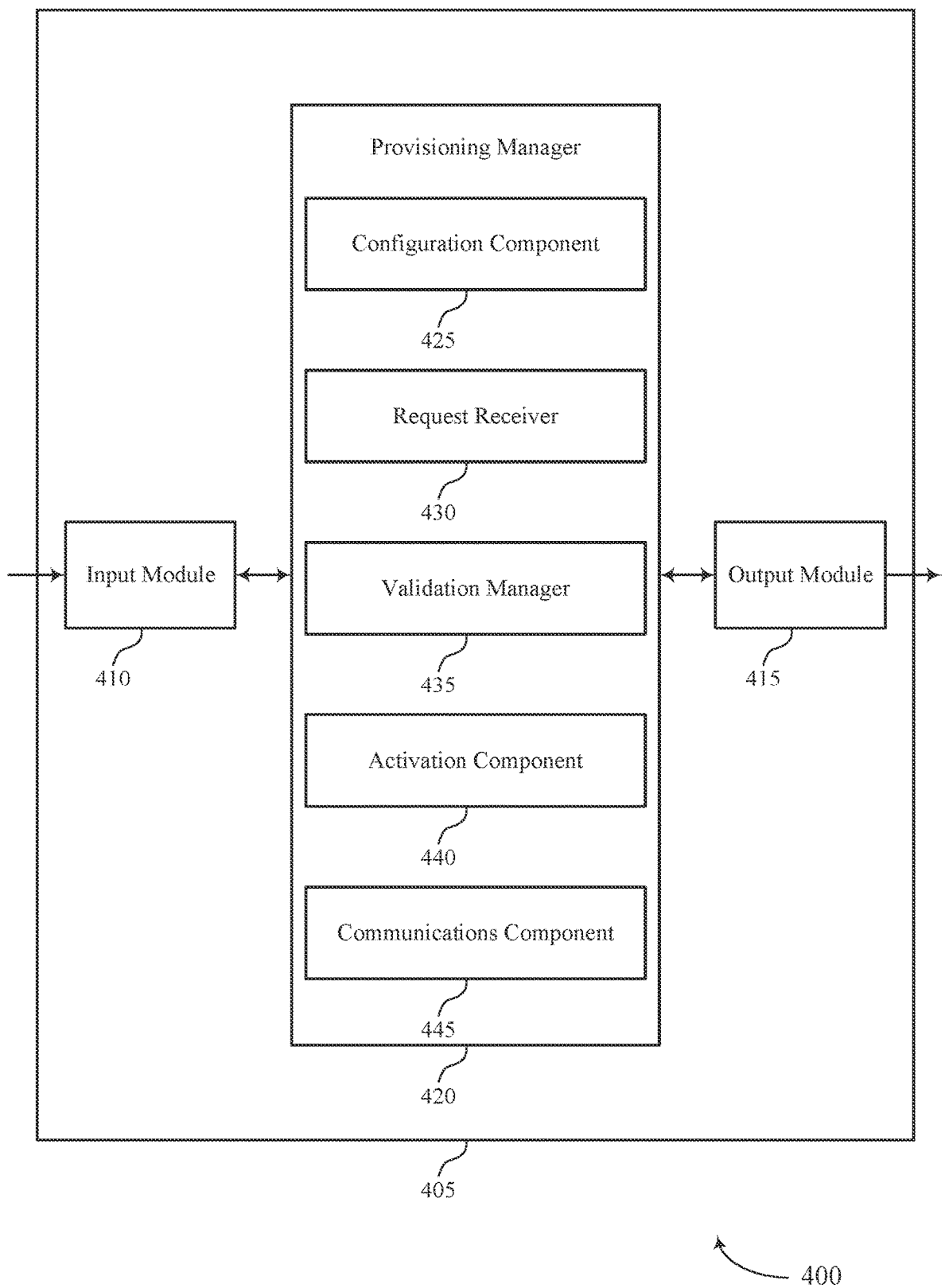
FIG. 4 shows a block diagram of an apparatus that supports real-time feature activation in distributed environment in accordance with aspects of the present disclosure.

FIG. 4 shows a block diagram 400 of a device 405 that supports real-time feature activation in distributed environment in accordance with aspects of the present disclosure. The device 405 may include an input module 410, an output module 415, and a provisioning manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the provisioning manager 420 to support real-time feature activation in distributed environment. In some cases, the input module 410 may be a component of an I/O controller 610 as described with reference to FIG. 6.

The output module 415 may manage output signals for the device 405. For example, the output module 415 may receive signals from other components of the device 405, such as the provisioning manager 420, and may transmit these signals to other components or devices. In some specific examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the provisioning manager 420 may include a configuration component 425, a request receiver 430, a validation manager 435, an activation component 440, a communications component 445, or any combination thereof. In some examples, the provisioning manager 420, or various components thereof, may be configured to perform various operations (e.g., receiving, monitoring, transmitting) using or otherwise in cooperation with the input module 410, the output module 415, or both. For example, the provisioning manager 420 may receive information from the input module 410, send information to the output module 415, or be integrated in combination with the input module 410, the output module 415, or both to receive information, transmit information, or perform various other operations as described herein.

The provisioning manager 420 may support data processing at an application server in accordance with examples as disclosed herein. The configuration component 425 may be configured as or otherwise support a means for identifying, by the application server, a configuration for a user for an application associated with the application server, the configuration indicating a plurality of features of the application and a set of permissions for the user for the plurality of features of the application. The request receiver 430 may be configured as or otherwise support a means for receiving, from the user, a request for a permission change for a feature of the plurality of features. The validation manager 435 may be configured as or otherwise support a means for performing a validation procedure of the permission change to validate that the feature of the plurality of features is available to the user based at least in part on the set of permissions. The activation component 440 may be configured as or otherwise support a means for activating, by the application server, the feature based at least in part on the validation procedure and the request. The communications component 445 may be configured as or otherwise support a means for communicating, by the application server and with a provisioning server after activating the feature for the user, information indicative of the permission change and the activated feature for the user.

Figure 5:
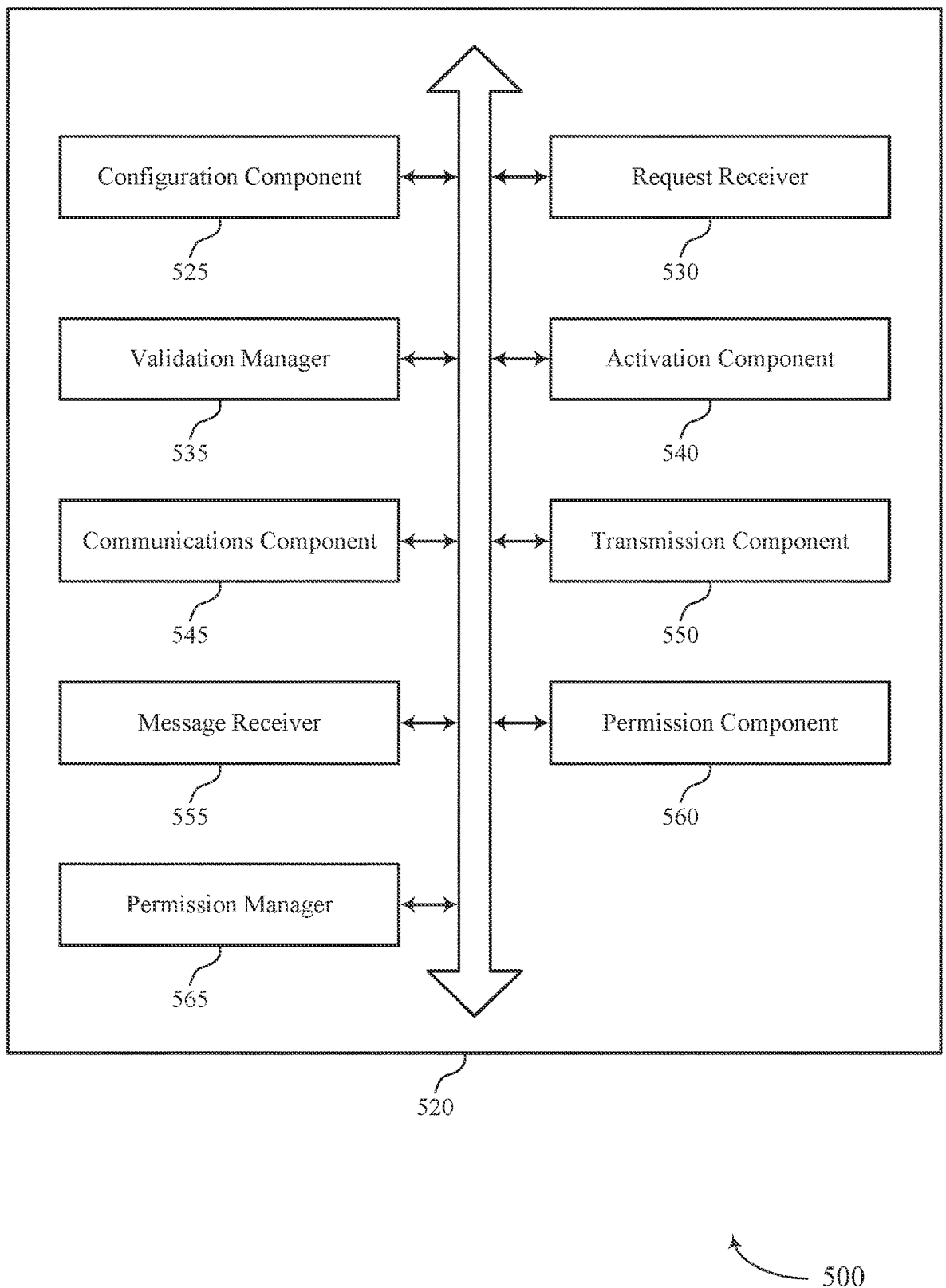
FIG. 5 shows a block diagram of a provisioning manager that supports real-time feature activation in distributed environment in accordance with aspects of the present disclosure.

FIG. 5 shows a block diagram 500 of a provisioning manager 520 that supports real-time feature activation in distributed environment in accordance with aspects of the present disclosure. The provisioning manager 520 may be an example of aspects of a provisioning manager or a provisioning manager 420, or both, as described herein. The provisioning manager 520, or various components thereof, may be an example of means for performing various aspects of real-time feature activation in distributed environment as described herein. For example, the provisioning manager 520 may include a configuration component 525, a request receiver 530, a validation manager 535, an activation component 540, a communications component 545, a transmission component 550, a message receiver 555, a permission component 560, a permission manager 565, or any combination thereof. Each of these components may communicate, directly or indirectly, with one another (e.g., via one or more buses).

The provisioning manager 520 may support data processing at an application server in accordance with examples as disclosed herein. The configuration component 525 may be configured as or otherwise support a means for identifying, by the application server, a configuration for a user for an application associated with the application server, the configuration indicating a plurality of features of the application and a set of permissions for the user for the plurality of features of the application. The request receiver 530 may be configured as or otherwise support a means for receiving, from the user, a request for a permission change for a feature of the plurality of features. The validation manager 535 may be configured as or otherwise support a means for performing a validation procedure of the permission change to validate that the feature of the plurality of features is available to the user based at least in part on the set of permissions. The activation component 540 may be configured as or otherwise support a means for activating, by the application server, the feature based at least in part on the validation procedure and the request. The communications component 545 may be configured as or otherwise support a means for communicating, by the application server and with a provisioning server after activating the feature for the user, information indicative of the permission change and the activated feature for the user.

In some examples, to support identifying the configuration for the user, the configuration component 525 may be configured as or otherwise support a means for accessing the configuration stored locally at a device associated with the user or at a database associated with the application server.

In some examples, to support communicating information indicative of the permission change and the activated feature for the user, the transmission component 550 may be configured as or otherwise support a means for transmitting, to the provisioning server, a message indicating a successful validation procedure of the permission change requested by the user and an indication that the feature for the user is activated.

In some examples, to support communicating information indicative of the permission change and the activated feature for the user, the message receiver 555 may be configured as or otherwise support a means for receiving, from the provisioning server, a message requesting an update of the set of permissions for the user. In some examples, to support communicating information indicative of the permission change and the activated feature for the user, the transmission component 550 may be configured as or otherwise support a means for transmitting, in response to the message, the information indicative of the permission change and the activated feature for the user.

In some examples, the message receiver 555 may be configured as or otherwise support a means for periodically receiving messages from the provisioning server requesting permission updates for a set of users of the application including the user.

In some examples, the transmission component 550 may be configured as or otherwise support a means for transmitting a query to the provisioning server requesting provisioning of the feature for the user based at least in part on the activating.

In some examples, the message receiver 555 may be configured as or otherwise support a means for receiving a query response from the provisioning server indicating that the feature for the user is provisioned. In some examples, the permission manager 565 may be configured as or otherwise support a means for updating the set of permissions for the user based at least in part on the query response.

In some examples, the message receiver 555 may be configured as or otherwise support a means for receiving a query response from the provisioning server indicating that the feature for the user is not provisioned. In some examples, the transmission component 550 may be configured as or otherwise support a means for transmitting a second query to the provisioning server requesting provisioning of the feature for the user based at least in part on the query response.

In some examples, to support performing the validation procedure, the validation manager 535 may be configured as or otherwise support a means for determining which of the plurality of features are available to the user based at least in part on a priority level of the user, wherein the priority level of the user is application-specific.

In some examples, to support performing the validation procedure, the validation manager 535 may be configured as or otherwise support a means for validating the permission change based at least in part on the feature being available for the priority level.

In some examples, to support performing the validation procedure, the validation manager 535 may be configured as or otherwise support a means for validating the permission change based at least in part on verification of payment information of the user for the feature.

In some examples, the permission change corresponds to a trial of the feature, and the permission component 560 may be configured as or otherwise support a means for updating, as part of activating the feature, the set of permissions for the user for the feature, wherein the set of permissions comprises trial information for the trial of the feature including a trial start date, a trial end date, a trial status, or a provisioning server status, or any combination thereof.

In some examples, the permission change corresponds to a purchase of the feature, and the permission component 560 may be configured as or otherwise support a means for updating, as part of activating the feature, the set of permissions for the user for the feature within the configuration, wherein the set of permissions comprises purchase information for the purchase of the feature including a purchase start date, a purchase end date, a purchase status, or a provisioning server status, or any combination thereof.

Figure 6:
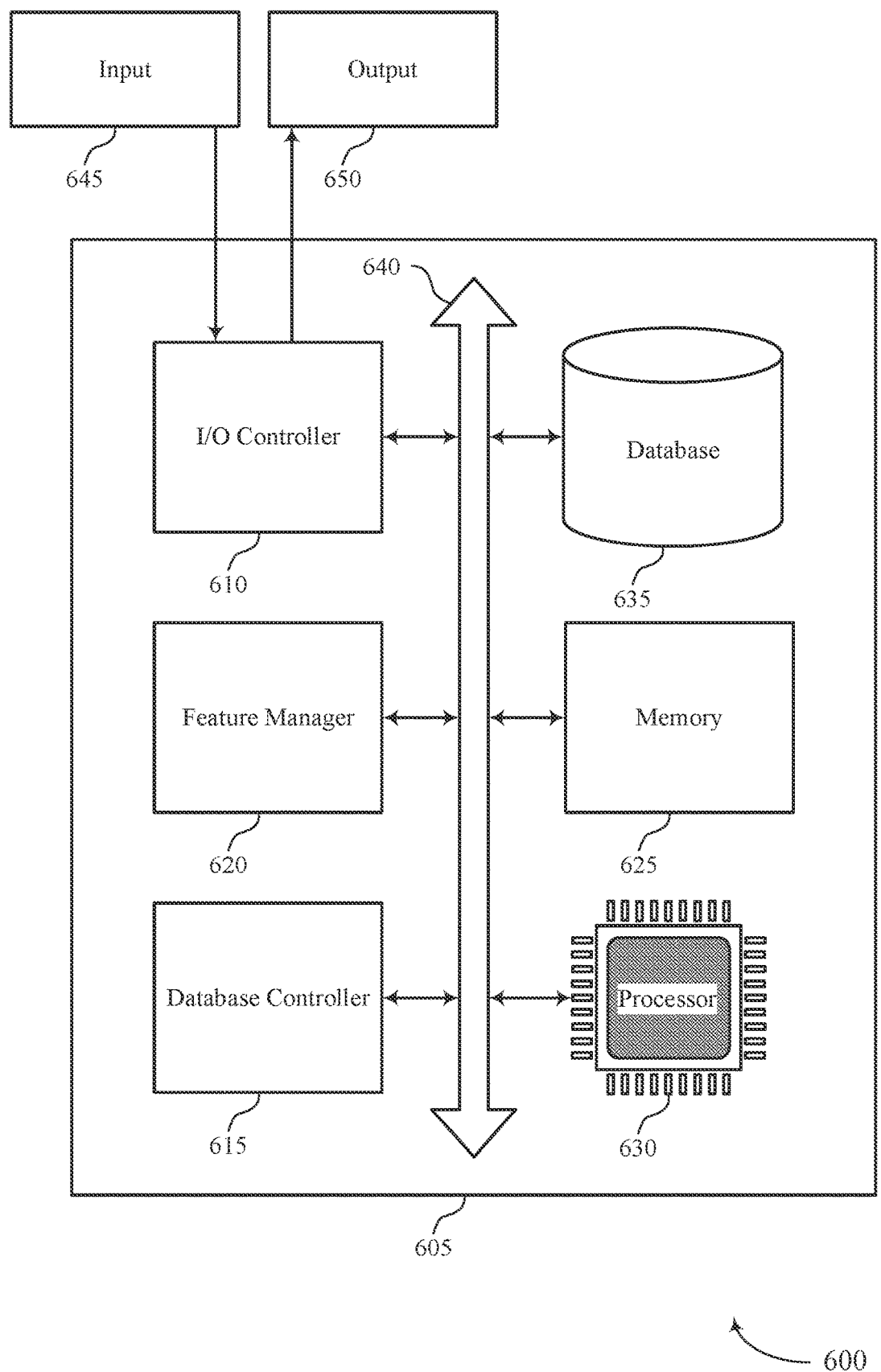
FIG. 6 shows a diagram of a system including a device that supports real-time feature activation in distributed environment in accordance with aspects of the present disclosure.

FIG. 6 shows a diagram of a system 600 including a device 605 that supports real-time feature activation in distributed environment in accordance with aspects of the present disclosure. The device 605 may be an example of or include the components of a device 405 as described herein. The device 605 may include components for bi-directional data communications including components for transmitting and receiving communications, such as a provisioning manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor. In some cases, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting real-time feature activation in distributed environment).

The provisioning manager 620 may support data processing at an application server in accordance with examples as disclosed herein. For example, the provisioning manager 620 may be configured as or otherwise support a means for identifying, by the application server, a configuration for a user for an application associated with the application server, the configuration indicating a plurality of features of the application and a set of permissions for the user for the plurality of features of the application. The provisioning manager 620 may be configured as or otherwise support a means for receiving, from the user, a request for a permission change for a feature of the plurality of features. The provisioning manager 620 may be configured as or otherwise support a means for performing a validation procedure of the permission change to validate that the feature of the plurality of features is available to the user based at least in part on the set of permissions. The provisioning manager 620 may be configured as or otherwise support a means for activating, by the application server, the feature basing at least in part on the validation procedure and the request. The provisioning manager 620 may be configured as or otherwise support a means for communicating, by the application server and with a provisioning server after activating the feature for the user, information indicative of the permission change and the activated feature for the user.

By including or configuring the provisioning manager 620 in accordance with examples as described herein, the device 605 may support techniques for reduced latency for provisioning of features of an application for the device 605, which may improve user experience. The device 605 may support techniques for enabling feature trials, upgrades or downgrades, or add-ons for an application for the user, which may allow for a more dynamic user experience and increased revenue.

Figure 7:
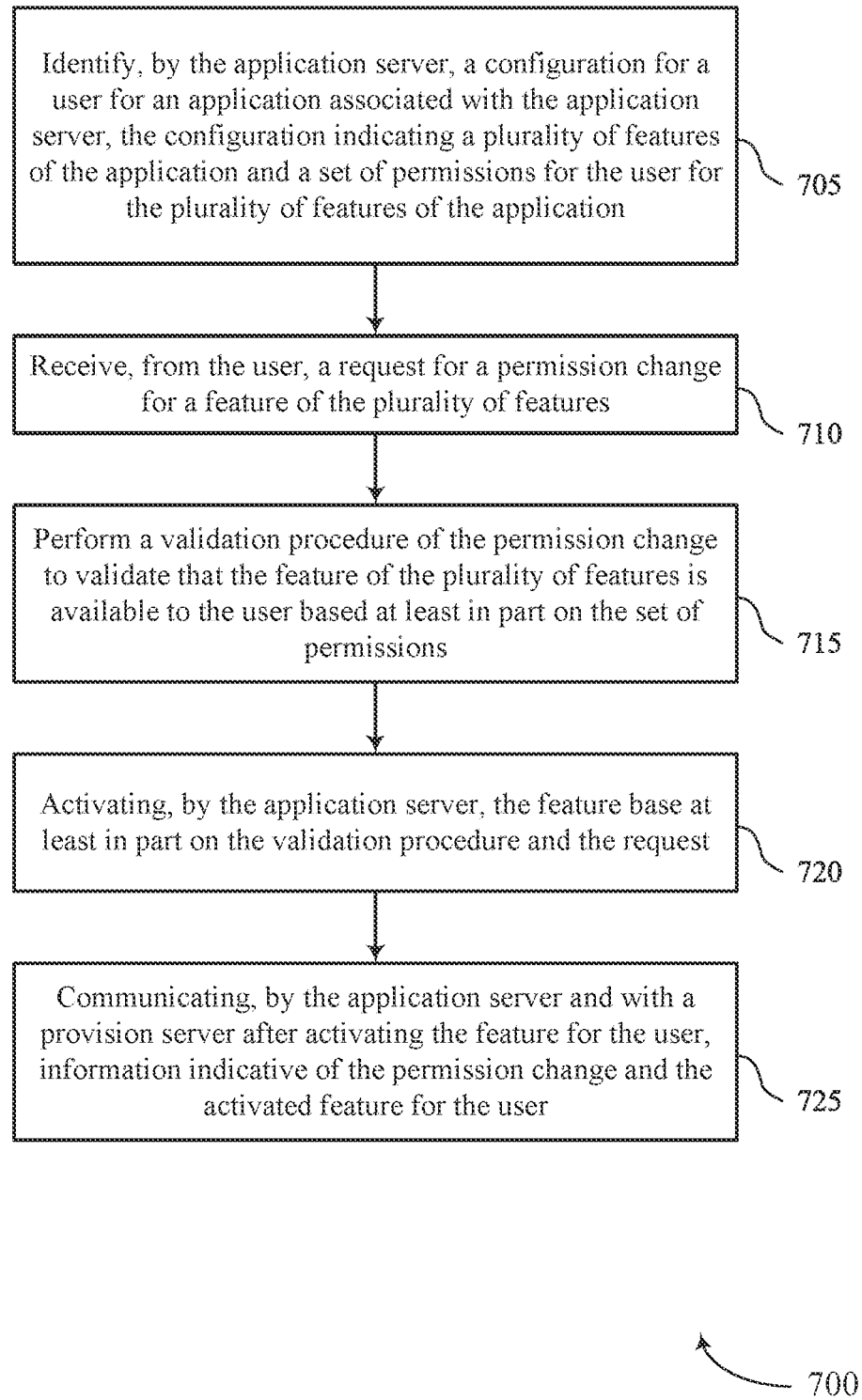
FIGS. 7 through 9 show flowcharts illustrating methods that support real-time feature activation in distributed environment in accordance with aspects of the present disclosure.

FIG. 7 shows a flowchart illustrating a method 700 that supports real-time feature activation in distributed environment in accordance with aspects of the present disclosure. The operations of the method 700 may be implemented by an Application Server or its components as described herein. For example, the operations of the method 700 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 705, the method may include identifying, by the application server, a configuration for a user for an application associated with the application server, the configuration indicating a plurality of features of the application and a set of permissions for the user for the plurality of features of the application. The operations of 705 may be performed in accordance with examples as disclosed herein. In some examples, aspects of the operations of 705 may be performed by a configuration component 525 as described with reference to FIG. 5.

At 710, the method may include receiving, from the user, a request for a permission change for a feature of the plurality of features. The operations of 710 may be performed in accordance with examples as disclosed herein. In some examples, aspects of the operations of 710 may be performed by a request receiver 530 as described with reference to FIG. 5.

At 715, the method may include performing a validation procedure of the permission change to validate that the feature of the plurality of features is available to the user based at least in part on the set of permissions. The operations of 715 may be performed in accordance with examples as disclosed herein. In some examples, aspects of the operations of 715 may be performed by a validation manager 535 as described with reference to FIG. 5.

At 720, the method may include activating, by the application server, the feature based at least in part on the validation procedure and the request. The operations of 720 may be performed in accordance with examples as disclosed herein. In some examples, aspects of the operations of 720 may be performed by an activation component 540 as described with reference to FIG. 5.

At 725, the method may include communicating, by the application server and with a provisioning server after activating the feature for the user, information indicative of the permission change and the activated feature for the user. The operations of 725 may be performed in accordance with examples as disclosed herein. In some examples, aspects of the operations of 725 may be performed by a communications component 545 as described with reference to FIG. 5.

Figure 8:
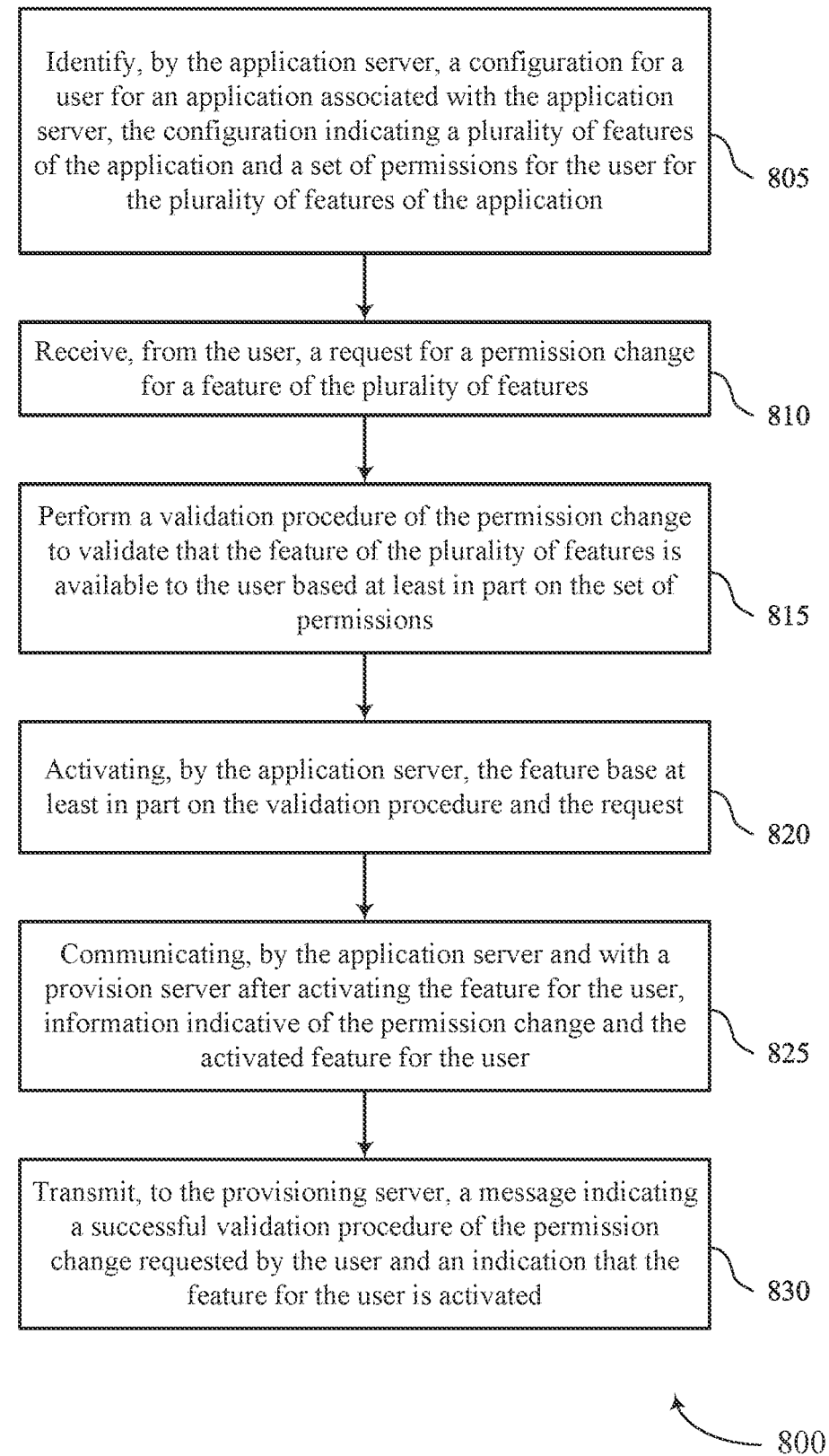

FIG. 8 shows a flowchart illustrating a method 800 that supports real-time feature activation in distributed environment in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 805, the method may include identifying, by the application server, a configuration for a user for an application associated with the application server, the configuration indicating a plurality of features of the application and a set of permissions for the user for the plurality of features of the application. The operations of 805 may be performed in accordance with examples as disclosed herein. In some examples, aspects of the operations of 805 may be performed by a configuration component 525 as described with reference to FIG. 5.

At 810, the method may include receiving, from the user, a request for a permission change for a feature of the plurality of features. The operations of 810 may be performed in accordance with examples as disclosed herein. In some examples, aspects of the operations of 810 may be performed by a request receiver 530 as described with reference to FIG. 5.

At 815, the method may include performing a validation procedure of the permission change to validate that the feature of the plurality of features is available to the user based at least in part on the set of permissions. The operations of 815 may be performed in accordance with examples as disclosed herein. In some examples, aspects of the operations of 815 may be performed by a validation manager 535 as described with reference to FIG. 5.

At 820, the method may include activating, by the application server, the feature based at least in part on the validation procedure and the request. The operations of 820 may be performed in accordance with examples as disclosed herein. In some examples, aspects of the operations of 820 may be performed by an activation component 540 as described with reference to FIG. 5.

At 825, the method may include communicating, by the application server and with a provisioning server after activating the feature for the user, information indicative of the permission change and the activated feature for the user. The operations of 825 may be performed in accordance with examples as disclosed herein. In some examples, aspects of the operations of 825 may be performed by a communications component 545 as described with reference to FIG. 5.

At 830, the method may include transmitting, to the provisioning server, a message indicating a successful validation procedure of the permission change requested by the user and an indication that the feature for the user is activated. The operations of 830 may be performed in accordance with examples as disclosed herein. In some examples, aspects of the operations of 830 may be performed by a transmission component 550 as described with reference to FIG. 5.

Figure 9:
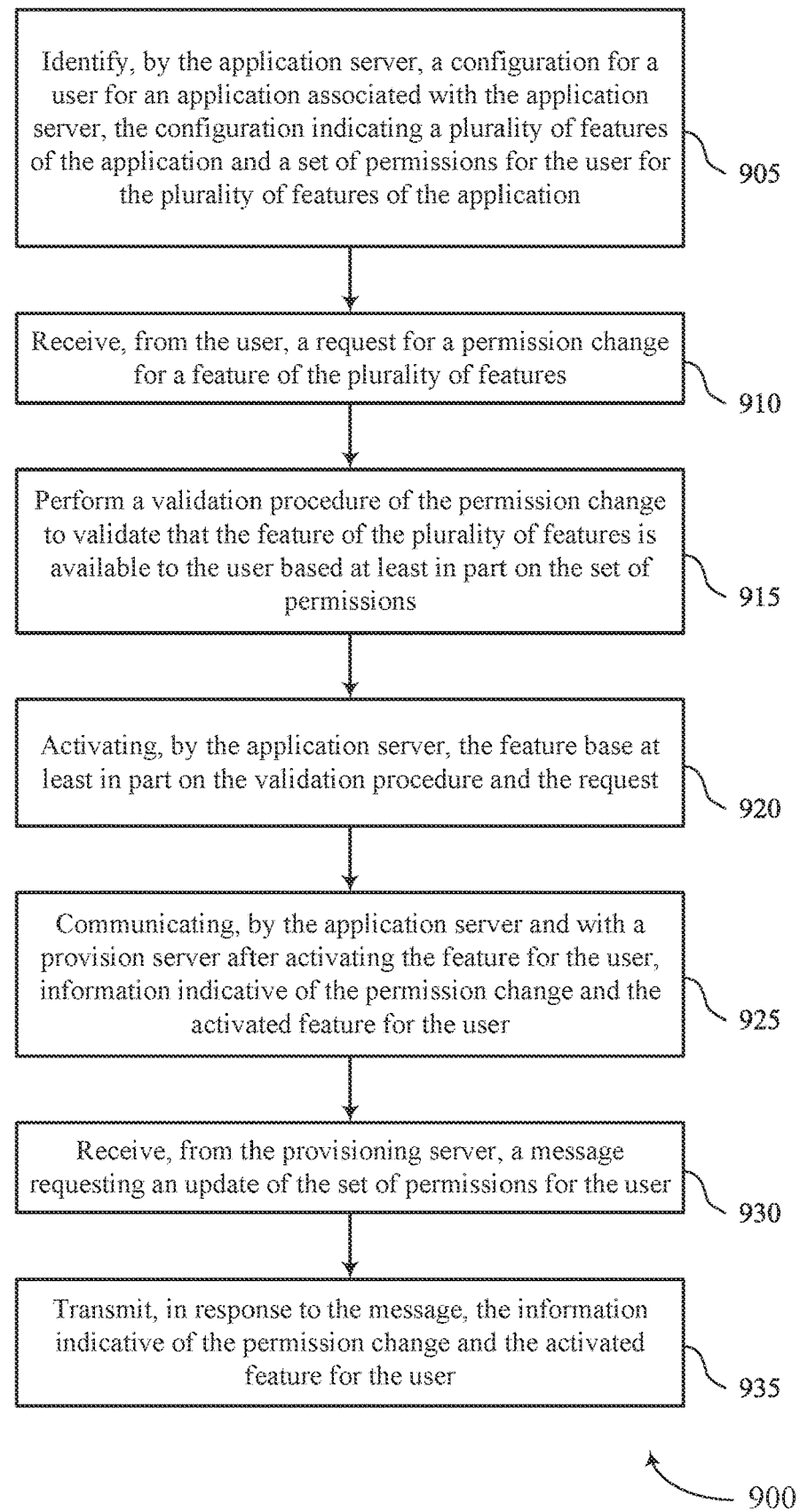

FIG. 9 shows a flowchart illustrating a method 900 that supports real-time feature activation in distributed environment in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 905, the method may include identifying, by the application server, a configuration for a user for an application associated with the application server, the configuration indicating a plurality of features of the application and a set of permissions for the user for the plurality of features of the application. The operations of 905 may be performed in accordance with examples as disclosed herein. In some examples, aspects of the operations of 905 may be performed by a configuration component 525 as described with reference to FIG. 5.

At 910, the method may include receiving, from the user, a request for a permission change for a feature of the plurality of features. The operations of 910 may be performed in accordance with examples as disclosed herein. In some examples, aspects of the operations of 910 may be performed by a request receiver 530 as described with reference to FIG. 5.

At 915, the method may include performing a validation procedure of the permission change to validate that the feature of the plurality of features is available to the user based at least in part on the set of permissions. The operations of 915 may be performed in accordance with examples as disclosed herein. In some examples, aspects of the operations of 915 may be performed by a validation manager 535 as described with reference to FIG. 5.

At 920, the method may include activating, by the application server, the feature based at least in part on the validation procedure and the request. The operations of 920 may be performed in accordance with examples as disclosed herein. In some examples, aspects of the operations of 920 may be performed by an activation component 540 as described with reference to FIG. 5.

At 925, the method may include communicating, by the application server and with a provisioning server after activating the feature for the user, information indicative of the permission change and the activated feature for the user. The operations of 925 may be performed in accordance with examples as disclosed herein. In some examples, aspects of the operations of 925 may be performed by a communications component 545 as described with reference to FIG. 5.

At 930, the method may include receiving, from the provisioning server, a message requesting an update of the set of permissions for the user. The operations of 930 may be performed in accordance with examples as disclosed herein. In some examples, aspects of the operations of 930 may be performed by a message receiver 555 as described with reference to FIG. 5.

At 935, the method may include transmitting, in response to the message, the information indicative of the permission change and the activated feature for the user. The operations of 935 may be performed in accordance with examples as disclosed herein. In some examples, aspects of the operations of 935 may be performed by a transmission component 550 as described with reference to FIG. 5.

A method for data processing at an application server is described. The method may include identifying, by the application server, a configuration for a user for an application associated with the application server, the configuration indicating a plurality of features of the application and a set of permissions for the user for the plurality of features of the application, receiving, from the user, a request for a permission change for a feature of the plurality of features, performing a validation procedure of the permission change to validate that the feature of the plurality of features is available to the user based at least in part on the set of permissions, activating, by the application server, the feature based at least in part on the validation procedure and the request, and communicating, by the application server and with a provisioning server after activating the feature for the user, information indicative of the permission change and the activated feature for the user.

An apparatus for data processing at an application server is described. The apparatus may include a processor, memory coupled with the processor, and instructions stored in the memory. The instructions may be executable by the processor to cause the apparatus to identify, by the application server, a configuration for a user for an application associated with the application server, the configuration indicating a plurality of features of the application and a set of permissions for the user for the plurality of features of the application, receive, from the user, a request for a permission change for a feature of the plurality of features, perform a validation procedure of the permission change to validate that the feature of the plurality of features is available to the user based at least in part on the set of permissions, activating, by the application server, the feature base at least in part on the validation procedure and the request, and communicating, by the application server and with a provision server after activating the feature for the user, information indicative of the permission change and the activated feature for the user.

Another apparatus for data processing at an application server is described. The apparatus may include means for identifying, by the application server, a configuration for a user for an application associated with the application server, the configuration indicating a plurality of features of the application and a set of permissions for the user for the plurality of features of the application, means for receiving, from the user, a request for a permission change for a feature of the plurality of features, means for performing a validation procedure of the permission change to validate that the feature of the plurality of features is available to the user based at least in part on the set of permissions, means for activating, by the application server, the feature based at least in part on the validation procedure and the request, and means for communicating, by the application server and with a provisioning server after activating the feature for the user, information indicative of the permission change and the activated feature for the user.

A non-transitory computer-readable medium storing code for data processing at an application server is described. The code may include instructions executable by a processor to identify, by the application server, a configuration for a user for an application associated with the application server, the configuration indicating a plurality of features of the application and a set of permissions for the user for the plurality of features of the application, receive, from the user, a request for a permission change for a feature of the plurality of features, perform a validation procedure of the permission change to validate that the feature of the plurality of features is available to the user based at least in part on the set of permissions, activating, by the application server, the feature base at least in part on the validation procedure and the request, and communicating, by the application server and with a provision server after activating the feature for the user, information indicative of the permission change and the activated feature for the user.

In some examples of the method, apparatuses, and non-transitory computer-readable medium described herein, identifying the configuration for the user may include operations, features, means, or instructions for accessing the configuration stored locally at a device associated with the user or at a database associated with the application server.

In some examples of the method, apparatuses, and non-transitory computer-readable medium described herein, communicating information indicative of the permission change and the activated feature for the user may include operations, features, means, or instructions for transmitting, to the provisioning server, a message indicating a successful validation procedure of the permission change requested by the user and an indication that the feature for the user may be activated.

In some examples of the method, apparatuses, and non-transitory computer-readable medium described herein, communicating information indicative of the permission change and the activated feature for the user may include operations, features, means, or instructions for receiving, from the provisioning server, a message requesting an update of the set of permissions for the user and transmitting, in response to the message, the information indicative of the permission change and the activated feature for the user.

In some examples of the method, apparatuses, and non-transitory computer-readable medium described herein, periodically receiving messages from the provisioning server requesting permission updates for a set of users of the application including the user.

Some examples of the method, apparatuses, and non-transitory computer-readable medium described herein may further include operations, features, means, or instructions for transmitting a query to the provisioning server requesting provisioning of the feature for the user based at least in part on the activating.

Some examples of the method, apparatuses, and non-transitory computer-readable medium described herein may further include operations, features, means, or instructions for receiving a query response from the provisioning server indicating that the feature for the user may be provisioned and updating the set of permissions for the user based at least in part on the query response.

Some examples of the method, apparatuses, and non-transitory computer-readable medium described herein may further include operations, features, means, or instructions for receiving a query response from the provisioning server indicating that the feature for the user may be not provisioned and transmitting a second query to the provisioning server requesting provisioning of the feature for the user based at least in part on the query response.

In some examples of the method, apparatuses, and non-transitory computer-readable medium described herein, performing the validation procedure may include operations, features, means, or instructions for determining which of the plurality of features may be available to the user based at least in part on a priority level of the user, wherein the priority level of the user may be application-specific.

In some examples of the method, apparatuses, and non-transitory computer-readable medium described herein, performing the validation procedure may include operations, features, means, or instructions for validating the permission change based at least in part on the feature being available for the priority level.

In some examples of the method, apparatuses, and non-transitory computer-readable medium described herein, performing the validation procedure may include operations, features, means, or instructions for validating the permission change based at least in part on verification of payment information of the user for the feature.

In some examples of the method, apparatuses, and non-transitory computer-readable medium described herein, the permission change corresponds to a trial of the feature and the method, apparatuses, and non-transitory computer-readable medium may include further operations, features, means, or instructions for updating, as part of activating the feature, the set of permissions for the user for the feature, wherein the set of permissions comprises trial information for the trial of the feature including a trial start date, a trial end date, a trial status, or a provisioning server status, or any combination thereof.

In some examples of the method, apparatuses, and non-transitory computer-readable medium described herein, the permission change corresponds to a purchase of the feature and the method, apparatuses, and non-transitory computer-readable medium may include further operations, features, means, or instructions for updating, as part of activating the feature, the set of permissions for the user for the feature within the configuration, wherein the set of permissions comprises purchase information for the purchase of the feature including a purchase start date, a purchase end date, a purchase status, or a provisioning server status, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:

identifying, by the application server, a configuration for a user for an application associated with the application server, the configuration indicating a plurality of features of the application and a set of permissions for the user for the plurality of features of the application;

receiving, from the user, a request for a permission change for a feature of the plurality of features, wherein the permission change corresponds to a trial of the feature;

performing a validation procedure of the permission change to validate that the feature of the plurality of features is available to the user based at least in part on the set of permissions; and activating, by the application server, the feature based at least in part on the validation procedure and the request.

2. The method of claim 1, wherein identifying the configuration for the user comprises:

accessing the configuration stored locally at a device associated with the user or at a database associated with the application server.

3. The method of claim 1, further comprising:
communicating, by the application server and with a provisioning server after activating the feature for the user, information indicative of the permission change and the activated feature for the user, wherein communicating information indicative of the permission change and the activated feature for the user comprises:
transmitting, to the provisioning server, a message indicating a successful validation procedure of the permission change requested by the user and an indication that the feature for the user is activated.

4. The method of claim 1, further comprising:
communicating, by the application server and with a provisioning server after activating the feature for the user, information indicative of the permission change and the activated feature for the user, wherein communicating information indicative of the permission change and the activated feature for the user comprises:
receiving, from the provisioning server, a message requesting an update of the set of permissions for the user; and
transmitting, in response to the message, the information indicative of the permission change and the activated feature for the user.

5. The method of claim 4, further comprising:
periodically receiving messages from the provisioning server requesting permission updates for a set of users of the application including the user.

6. The method of claim 1, further comprising:
transmitting a query to a provisioning server requesting provisioning of the feature for the user based at least in part on the activating.

7. The method of claim 6, further comprising:
receiving a query response from the provisioning server indicating that the feature for the user is provisioned; and
updating the set of permissions for the user based at least in part on the query response.

8. The method of claim 6, further comprising:
receiving a query response from the provisioning server indicating that the feature for the user is not provisioned; and
transmitting a second query to the provisioning server requesting provisioning of the feature for the user based at least in part on the query response.

9. The method of claim 1, wherein performing the validation procedure comprises:
determining which of the plurality of features are available to the user based at least in part on a priority level of the user, wherein the priority level of the user is application-specific.

10. The method of claim 9, wherein performing the validation procedure comprises:
validating the permission change based at least in part on the feature being available for the priority level.

11. The method of claim 1, wherein performing the validation procedure comprises:
validating the permission change based at least in part on verification of payment information of the user for the feature.

12. The method of claim 1, further comprising:
updating, as part of activating the feature, the set of permissions for the user for the feature, wherein the set of permissions comprises trial information for the trial of the feature including a trial start date, a trial end date, a trial status, or a provisioning server status, or any combination thereof.

13. The method of claim 1, wherein the permission change corresponds to a purchase of the feature, the method further comprising:
updating, as part of activating the feature, the set of permissions for the user for the feature within the configuration, wherein the set of permissions comprises purchase information for the purchase of the feature including a purchase start date, a purchase end date, a purchase status, or a provisioning server status, or any combination thereof.

14. An apparatus for data processing at an application server, comprising:
a processor;
memory coupled with the processor; and
instructions stored in the memory and executable by the processor to cause the apparatus to:
identify, by the application server, a configuration for a user for an application associated with the application server, the configuration indicating a plurality of features of the application and a set of permissions for the user for the plurality of features of the application;
receive, from the user, a request for a permission change for a feature of the plurality of features, wherein the permission change corresponds to a trial of the feature;
perform a validation procedure of the permission change to validate that the feature of the plurality of features is available to the user based at least in part on the set of permissions; and
activate, by the application server, the feature based at least in part on the validation procedure and the request.

15. The apparatus of claim 14, wherein the instructions to identify the configuration for the user are executable by the processor to cause the apparatus to:
access the configuration stored locally at a device associated with the user or at a database associated with the application server.

16. The apparatus of claim 14, wherein the instructions to identify the configuration for the user are executable by the processor to cause the apparatus to:
communicate, by the application server and with a provisioning server after activating the feature for the user, information indicative of the permission change and the activated feature for the user, wherein the instructions to communicate information indicative of the permission change and the activated feature for the user are executable by the processor to cause the apparatus to:
transmit, to the provisioning server, a message indicating a successful validation procedure of the permission change requested by the user and an indication that the feature for the user is activated.

17. The apparatus of claim 14, wherein the instructions to identify the configuration for the user are executable by the processor to cause the apparatus to:
communicate, by the application server and with a provisioning server after activating the feature for the user, information indicative of the permission change and the activated feature for the user, wherein the instructions to communicate information indicative of the permission change and the activated feature for the user are executable by the processor to cause the apparatus to:
receive, from the provisioning server, a message requesting an update of the set of permissions for the user; and
transmit, in response to the message, the information indicative of the permission change and the activated feature for the user.

18. The apparatus of claim 17, wherein the instructions are further executable by the processor to cause the apparatus to:
   periodically receive messages from the provisioning server requesting permission updates for a set of users of the application including the user.

19. The apparatus of claim 14, wherein the instructions are further executable by the processor to cause the apparatus to:
   transmit a query to a provisioning server requesting provisioning of the feature for the user based at least in part on the activating.

20. A non-transitory computer-readable medium storing code for data processing at an application server, the code comprising instructions executable by a processor to:
   identify, by the application server, a configuration for a user for an application associated with the application server, the configuration indicating a plurality of features of the application and a set of permissions for the user for the plurality of features of the application;
   receive, from the user, a request for a permission change for a feature of the plurality of features, wherein the permission change corresponds to a trial of the feature;
   perform a validation procedure of the permission change to validate that the feature of the plurality of features is available to the user based at least in part on the set of permissions; and
   activate, by the application server, the feature based at least in part on the validation procedure and the request.

* * * * *